United States Patent
Inger et al.

(10) Patent No.: US 7,157,141 B2
(45) Date of Patent: Jan. 2, 2007

(54) PULVERULENT POLYMERS CROSSLINKED ON THE SURFACE

(75) Inventors: Waldemar Inger, Krefeld (DE); Rudiger Hose, Tonisvorst (DE); Heinz-Peter Bohlmann, Krefeld (DE)

(73) Assignee: Stockhausen GmbH, Krefeld (DE)

( * ) Notice: Subject to any disclaimer, the term of this patent is extended or adjusted under 35 U.S.C. 154(b) by 0 days.

(21) Appl. No.: 10/260,313

(22) Filed: Sep. 27, 2002

(65) Prior Publication Data

US 2004/0071966 A1 Apr. 15, 2004

Related U.S. Application Data

(63) Continuation of application No. PCT/EP01/02555, filed on Mar. 7, 2001.

(30) Foreign Application Priority Data

Mar. 31, 2000 (DE) .......................... 100 16 041

(51) Int. Cl.
  *B32B 5/16* (2006.01)

(52) U.S. Cl. .................. 428/403; 428/407; 525/381; 525/383; 525/384; 525/385

(58) Field of Classification Search ............... 428/403, 428/407; 525/381, 382, 384, 385
See application file for complete search history.

(56) References Cited

U.S. PATENT DOCUMENTS

| | | | |
|---|---|---|---|
| 4,043,952 A * | 8/1977 | Ganslaw et al. ............ 524/399 |
| 4,090,013 A | 5/1978 | Ganslaw et al. |
| 4,496,891 A | 1/1985 | Kobayashi |
| 4,558,091 A * | 12/1985 | Hubbard ............... 524/734 |
| 4,690,971 A | 9/1987 | Flesher et al. |
| 4,771,105 A | 9/1988 | Shirai et al. |
| 5,002,986 A | 3/1991 | Fujiura et al. |
| 5,145,906 A | 9/1992 | Chambers et al. |
| 5,149,334 A | 9/1992 | Lahrman et al. |
| 5,180,622 A | 1/1993 | Berg |
| 5,409,771 A | 4/1995 | Dahmen et al. |
| 5,419,956 A | 5/1995 | Roe et al. |
| 5,422,169 A | 6/1995 | Roe et al. |
| 5,453,323 A | 9/1995 | Chambers et al. |
| 5,502,089 A | 3/1996 | Bricker et al. |
| 5,505,718 A | 4/1996 | Roe et al. |
| 5,712,316 A | 1/1998 | Dahmen et al. |
| 5,837,789 A | 11/1998 | Stockhausen et al. |
| 6,300,275 B1 | 10/2001 | Weir |
| 6,300,423 B1 * | 10/2001 | Engelhardt et al. ......... 525/381 |
| 6,433,058 B1 | 8/2002 | Weir et al. |
| 6,602,950 B1 | 8/2003 | Dentler et al. |
| 2002/0169252 A1 | 11/2002 | Wilson |
| 2002/0193492 A1 | 12/2002 | Wilson |

FOREIGN PATENT DOCUMENTS

| | | |
|---|---|---|
| DE | 41 31 045 C1 | 9/1991 |
| EP | 0 233 067 A2 | 2/1987 |
| EP | 0 386 897 A2 | 2/1990 |
| EP | 0 233 067 B1 | 4/1990 |
| EP | 0 679 687 A2 | 4/1995 |
| EP | 0 882 502 A1 | 12/1998 |
| EP | 0 889 063 A1 | 1/1999 |
| EP | 0 945 143 A2 | 9/1999 |
| FR | 1304002 | 6/1959 |
| JP | 7308276 | 11/1995 |
| WO | WO 92/18171 | 10/1992 |
| WO | WO 94/22940 | 10/1994 |
| WO | WO 96/105234 | 2/1996 |
| WO | WO 98/48857 | 11/1998 |
| WO | WO 98/49221 A1 | 11/1998 |
| WO | WO 99/55767 A1 | 11/1999 |
| WO | WO 00/22018 | 4/2000 |
| WO | WO 01/41818 A1 | 6/2001 |
| WO | WO 01/42339 A1 | 6/2001 |
| WO | WO 01/45758 A1 | 6/2001 |

OTHER PUBLICATIONS

US 6,863,978, 3/2005, Inger et al. (withdrawn)*

* cited by examiner

*Primary Examiner*—Leszek Kiliman
(74) *Attorney, Agent, or Firm*—Smith Moore LLP

(57) ABSTRACT

The present invention relates to a pulverulent polymer post-crosslinked on the surface and absorbing water or aqueous liquids, synthesised from polymerised, optionally pre-crosslinked monomers containing partially neutralised carboxyl groups. The present invention also relates to a process for the post-treatment of the aforementioned polymers and the use of a solution of at least one salt of an at least trivalent cation for restoring the gel permeability of the aforementioned polymers that have been damaged by mechanical action.

16 Claims, No Drawings

PULVERULENT POLYMERS CROSSLINKED ON THE SURFACE

This application is a continuation of International Application No. PCT/EP01/02555, internationally filed Mar. 7, 2001.

FIELD OF THE INVENTION

The present invention relates to a pulverulent polymer post-crosslinked on the surface that absorbs water or aqueous liquids, synthesised from polymerised, optionally pre-crosslinked, partially neutralised monomers containing carboxyl groups. The present invention also relates to a process for the post-treatment of the aforementioned polymers and the use of a solution of at least one trivalent cation for the restoration of the gel permeability of the aforementioned polymers that have been damaged by mechanical action.

BACKGROUND OF THE INVENTION

Polymers that absorb aqueous liquids, so-called superabsorbers, are known from numerous publications. Modified natural polymers as well as partially or completely synthetic polymers may be used for this purpose. The fully synthetic polymers are, as a rule, produced by free-radical polymerisation of various hydrophilic monomers in aqueous solution according to different methods. In general, crosslinking agents are incorporated by polymerisation, whereby the polymer obtained is no longer water-soluble but is only water-swellable. For example, polymers based on (meth)acrylic acid that are present in partially neutralised form as alkali metal salt may be used as superabsorbers.

The superabsorber polymer is, as a rule, mechanically comminuted (reduced to a powder), dried and ground after the polymerisation. In this connection the pulverulent, water-swellable polymer falls in a more or less broad grain spectrum depending on the production process, which is typically in a range from 10 to 1000 µm, of which normally the grain fraction from 150 to 850 µm is used for practical purposes, above all in the hygiene sector, as absorption material. Fine fractions of less than 150 µm are undesirable on account of their dust-forming behaviour and their toxic properties when inhaled.

The development of more recent nappy constructions is highlighted by the tendency to replace increasingly larger proportions of the voluminous cellulose fluff by superabsorbers. This is happening on grounds of volume reduction and of an improved property profile. Due to the increased concentration of superabsorbers there is increased contact of the swollen absorber particles with one another after absorption of liquid has taken place. By means of the surface post-crosslinking methods described in the prior art, the so-called gel blocking, in which only the surfaces of the absorber particles swell and the liquid does not penetrate into the inner regions and swollen absorber particles that have clumped together build up to form a barrier layer for subsequent liquid, can be suppressed.

The superabsorbers are therefore post-crosslinked on the surface after the comminution, drying, grinding and grading.

Such surface post-crosslinking processes are described for example in patent specifications DE 40 20 780 C1 and U.S. Pat. No. 4,043,952. In DE 40 20 780 C1 the polymers are crosslinked on the particle surface by low molecular weight organic compounds. Not only is the absorptive capacity under pressure thereby raised, but also the behaviour of the absorbers known as "gel blocking" is suppressed. U.S. Pat. No. 4,043,952 discloses a treatment of the surface of the absorber particles with at least divalent metal ions (column 8, line 51) in organic solvents in order to improve the dispersibility in aqueous media and effect a more rapid absorption of the liquid. EP 233 067 B1 and U.S. Pat. No. 4,558,091 describe the surface post-crosslinking of superabsorbers based on polyacrylic acid and/or hydrolysed starch/acrylonitrile graft polymers with aluminium compounds in combination with polyhydroxyalcohols in order to improve the absorption properties.

During and after the surface post-crosslinking the polymer powders are changed by mixing and transportation processes as regards their grain spectrum, due to the formation of finely particulate abraded material, with the result that a renewed screening of the fine fractions is necessary in order to restore the previous state. This results in additional production costs and material losses since the fine fractions can now no longer be used at all, or at best only to a limited extent. In addition to the formation of the abraded material, there is also a deterioration of the absorption properties that had previously been improved by the surface post-crosslinking, i.e. in particular the ability of the swollen absorber gel to transport further liquid (gel permeability) is also impaired. This problem occurs not only in the production of the superabsorber powders, but ultimately also in their subsequent further processing for the production of hygiene products. In this case it is frequently found that the absorption properties of the superabsorbers are impaired due to abrasion during their conveyance, and undesirable dust is formed.

In EP 691 995 A1 describes measures for example for reducing the proportion of dust by addition of polyglycols, which however only prevent the dust but do not deal with the problem of the deteriorated absorption properties. U.S. Pat. No. 5,002,986 describes a process for improving the absorption rate of superabsorbers that consist only of fine fractions that are agglomerated in intensive mixers in the presence of ionic crosslinking agents to form larger particles. DE 196 46 484 A1 describes superabsorbers consisting of a combination of special crosslinking agents and monomers that suffer only a slight deterioration in properties under mechanical stress. A significant suppression of the property loss cannot however be achieved in this way.

In the prior art, no superabsorbing polymer is known whose properties are not impaired by mechanical stress during conveyance in production and nappy manufacture. The prior art also does not disclose any process that solves the problem of impairment of the properties of the superabsorber powders due to the mechanical stress during the surface modification and subsequent conveyance in production and nappy manufacture. In any case, a screening of fine fractions is carried out at the expense of product yield.

The object of the present invention is to provide polymers whose properties deteriorate only insignificantly during nappy manufacture, that do not form dust or only small amounts of dust, and that have a lesser tendency to form clumps in environments with a high atmospheric moisture content than products of the prior art. The object of the present invention is also to provide a process for the production of the aforementioned polymers, by means of which the screening of the fine fractions after the surface post-crosslinking is largely avoided without the properties of the polymer being substantially impaired. A further object of the present invention is to provide a substance by means of which the gel permeability of surface-crosslinked superabsorber powders containing fine fractions and that have been damaged by abrasion processes is restored.

SUMMARY OF THE INVENTION

This object is achieved according to the invention by a pulverulent polymer post-crosslinked on the surface that absorbs water or aqueous liquids, and that is synthesised from polymerised, optionally pre-crosslinked monomers containing partially neutralised carboxyl groups, wherein the pulverulent polymer has, after the post-crosslinking, been reacted with the preferably aqueous solution of at least one salt of an at least trivalent cation.

The polymers according to the invention have, compared to superabsorbers according to the prior art, improved gel permeabilities that correspond roughly to those of mechanically unstressed polymers. The retention behaviour is not reduced in the polymer according to the invention and the swellability under pressure is not impaired or only slightly so. Furthermore, it has been found that the polymers according to the invention have a good flowability and exhibit an improvement in the so-called anticaking behaviour, i.e. in a moist ambient atmosphere they have only a slight tendency to agglomerate and moreover exhibit a reduced dust formation. Accordingly, the treatment steps that are normally envisaged for the dust removal and anticaking treatment can be reduced or dispensed with entirely. The pulverulent polymers according to the invention permit a reliable further processing for example into nappies without dust formation and loss of properties during mechanical or pneumatic conveyance.

DETAILED DESCRIPTION OF THE INVENTION

The salt component that may be used in the solution according to the invention include chlorides, bromides, sulfates, carbonates, nitrates, phosphates as well as salts of organic acids, such as for example acetates and lactates, and other salts of at least trivalent cations. Examples of cations that may be used according to the invention include aluminium as well as iron, chromium, manganese, titanium, zirconium and other transition metals as well as double salts of two cations or also mixtures of several salts. Aluminium salts and alums and their various hydrates are preferred, such as for example $AlCl_3 \times 6\ H_2O$, $NaAl(SO_4)_2 \times 12\ H_2O$, $KAl(SO_4)_2 \times 12\ H_2O$ or $Al_2(SO_4)_3 \times 18\ H_2O$. $Al_2(SO_4)_3$ and its hydrates are particularly preferably used. The salt components are preferably used, calculated on the basis of the cation according to the invention, in amounts of about 0.001 to about 1.0 wt. %, preferably about 0.002 to about 0.5 wt. % and particularly preferably about 0.005 to about 0.2 wt. %, in each case referred to the polymer. The added amount is preferably calculated so that the absorption of the polymer powder under pressure is not, or only slightly, impaired.

The salts of at least trivalent cations to be used according to the present invention are preferably applied in the form of a solution. Suitable solvents are water or polar, water-miscible organic solvents such as for example acetone, methanol, ethanol or 2-propanol or their mixtures; water is preferably used. The term aqueous solution within the context of the invention means in relation to the solvent component that the solution may contain, apart from water, also other organic solvents. The concentration of the salts (calculated in anhydrous form) in the solvent may vary within wide limits and is generally in the range from about 1 to about 80 wt. %, preferably in a range from 1 to 60 wt. % and most particularly preferably in a range from about 5 to about 35 wt. %. The preferred solvent for the salt component is water, which is used in an amount of about 0.05 to about 10 wt. %, preferably about 0.1 to about 5 wt. % and particularly preferably about 0.1 to about 3 wt. %, referred to the polymer. The amount of water is preferably adjusted in the lower range so that sufficient liquid is available to distribute the salt solution. In the upper range the amount of water must on the other hand be optimised so that the formation of agglomerates, which may occur temporarily when using relatively large amounts of water, remains within acceptable limits. It is generally the case that, with increasing amount of salt of at least trivalent cations, increasing amounts of water may also be used without resulting in a temporary agglomerate formation.

Natural, partially synthetic and fully synthetic substances are suitable as water-swellable hydrophilic polymers. Partially synthetic and fully synthetic substances are preferred, in particular anionic polymers based on (meth)acrylic acid that are present in partially neutralised form as alkali metal salts, in particular sodium and/or potassium salts. The degree of neutralisation of the acid monomer components may vary, but is preferably between about 25 and about 85 mol %. These components may be homopolymers and copolymers that can be obtained from acrylic acid and/or methacrylic acid alone, from these monomers together with one or more other monomers, or simply from one or more other monomers. Examples include grafted-on anionic polymers based on (meth)acrylic acid, present in partially neutralised form as alkali metal salt and graft polymers on polyvinyl alcohols, on polysaccharides such as for example starch or cellulose or derivatives thereof, or on polyalkylene oxides such as polyethylene oxides or polypropylene oxides.

Monomers that may be used in addition to (meth)acrylic acid in the production of the polymers include methyl, ethyl and (poly)hydroxyalkyl esters of (meth)acrylic acid, (meth) acrylamide, crotonic acid, maleic and fumaric acids, itaconic acid, 2-acrylamido-2-methylpropanesulfonic acid, vinylsulfonic acid and vinylphosphonic acid and the methyl, ethyl and (poly)hydroxyalkyl esters and amides of these acids, amino group-containing and ammonium group-containing esters and amides of all the aforementioned acids and water-soluble N-vinylamides. Also the polymer may contain structural units derived from all monomers conventionally used in the production of superabsorber polymers. The polymer is preferably crosslinked.

Suitable crosslinking substances may contain two or more reactive groups that may be used in the production of the superabsorber polymers, whose structural units may then be contained in the polymer, which include polyglycidyl ethers, methylene bis(meth)acrylamide, bisacrylamidoacetic acid, esters of unsaturated acids of polyols and/or alkoxylated polyols, for example ethylene glycol di(meth)acrylate or trimethylolpropane triacrylate or allyl compounds, such as for example allyl (meth)acrylate, polyallyl esters, tetraallyloxyethane, triallylamine, tetraallyl ethylenediamine or allyl esters of phosphoric acid as well as vinylphosphonic acid derivatives. The proportion of crosslinking agents that are already added in the production of the superabsorber polymers is preferably about 0.01 to about 20 wt. %, particularly preferably about 0.1 to about 3 wt. %, referred to the total monomers used.

The production of the polymer is otherwise carried out according to well known methods, such as are described for example in DE 40 20 780 C1, which is hereby incorporated by reference. Preferably the production is done by polymerisation in aqueous solution according to the so-called gel polymerisation process.

The polymer powders are formed by comminution, drying and grinding of the polymer gels followed by surface post-crosslinking and may have a broad grain spectrum. Suitable substances for such a surface post-crosslinking are compounds containing two or more groups that can form covalent bonds with the carboxyl groups of the hydrophilic polymer. Suitable compounds are diols and polyols, diglycidyl compounds and polyglycidyl compounds such as phosphonic acid diglycidyl esters, alkylene carbonates such as ethylene carbonate, alkoxysilyl compounds, polyaziridines, polyamines or polyamidoamines, in which connection the aforementioned compounds may also be used in the form of mixtures with one another.

The surface post-crosslinking agent is used in an amount of about 0.01 to about 30 wt. %, preferably about 0.1 to about 10 wt. %, referred to the polymer to be post-crosslinked.

Before the surface post-crosslinking the polymer is preferably dried, ground and screened to the grain fraction appropriate for the respective application technology, and is then added to the surface post-crosslinking reaction. In many cases it has however also proved convenient to add the surface post-crosslinking agents already before the drying of the polymer gel and/or before the comminution of the partially or largely dried polymer. A surface post-crosslinking to be carried out according to the invention is described for example in U.S. Pat. No. 4,666,983 and in DE 40 20 780. These specifications are hereby introduced by way of reference. The addition of the surface post-crosslinking agents takes place in the form of a solution in water, organic solvents or mixtures thereof, especially if minor amounts of surface post-crosslinking agents are used. Suitable mixing units for applying the surface post-crosslinking agent are for example Patterson-Kelley mixers, DRAIS turbulence mixers, Lödige mixers, Ruberg mixers, screw mixers, pan mixers and fluidised bed mixers, as well as continuously operating vertical mixers in which the powder is mixed at high speed by means of rotating blades (Schugi mixers). After the surface post-crosslinking agent has been mixed with the pre-crosslinked polymer, the reaction mixture is heated to temperatures of about 60° to about 250° C., preferably to about 135° to about 200° C. and particularly preferably to about 150° to about 185° C. in order to carry out the surface post-crosslinking reaction. The duration of the post-heating is limited by the point at which the desired property profile of the polymer is destroyed again as a result of heat damage.

After the surface post-crosslinking step has been completed, the pulverulent polymer is reacted with the solution of at least one salt of an at least trivalent cation. The moisture content of the polymer powder before the reaction may fluctuate, and is typically less than about 10 wt. %, preferably less than about 8 wt. % and particularly preferably less than about 5 wt. %.

The polymer powder may contain fine fractions before the reaction. This fine fraction may be formed during the drying, grinding and/or post-crosslinking or may be added to the polymer powder, so that the polymer according to the invention may also contain recycled fine fractions. Preferably, the fine dust fraction with a mean grain diameter of less than about 150 μm is up to about 15 wt. %, particularly preferably up to about 10 wt. % and most particularly preferably up to about 5 wt. %. In order for the polymer powders to be used in the hygiene industry, an upper grain limit of about 1000 μm, preferably of about 850 μm, has proved suitable.

The powder and the solution of at least one salt of the at least trivalent cation are preferably intimately and as homogeneously as possible mixed with one another and thereby reacted.

The pulverulent water-swellable hydrophilic polymers according to the invention may be used for all purposes for which such superabsorbers are normally employed, in particular for the absorption of water and aqueous solutions. They are preferably used in the absorption of body fluids, in particular blood and urine. For this they are incorporated in particular in absorbing single-use disposable hygiene articles, for example in nappies, tampons or sanitary towels, or also for other medicinal purposes. Other possible uses include for example as water-storing floor improvement agents or as moisture binding agents for cable sheathing or as support material for active constituents and their controlled release.

The present invention also provides a process for the production of the polymers according to the invention, in which a solution of at least one salt of at least a trivalent cation is added to the pulverulent polymer after the post-crosslinking and the said pulverulent polymer and the solution are preferably homogeneously thoroughly mixed.

By means of the process according to the invention it is possible to restore the gel permeability of polymer powders that have suffered high abrasion damage. The stage involving the screening of the fine fractions after the post-crosslinking is omitted. The process products have, compared to superabsorbers according to the prior art, improved gel permeabilities that correspond approximately to those of mechanically unstressed polymers. The retention behaviour is not adversely affected by the process according to the invention and the swellability under pressure is not reduced or only slightly so. Furthermore it has been found that the pulverulent process products have a good flowability, an improvement in the so-called anticaking behaviour, i.e. only a slight tendency to agglomerate in a moist ambient atmosphere, and furthermore have a reduced tendency to form dust. The treatment steps that are normally envisaged for dust removal and anticaking behaviour may be reduced or dispensed with altogether. The polymer powders according to the invention permit a reliable further processing without formation of dust and loss of properties during mechanical or pneumatic conveyance. A further advantage of the process according to the invention is the fact that the solvent fraction introduced via the salt solution does not have to be distilled off, especially if it consists only of water, with the result that the polymer powder can be used without further working-up.

According to the invention a solution of at least one salt of an at least trivalent cation is added to the polymer powder after the post-crosslinking. The pulverulent polymer and the solution are preferably homogeneously thoroughly mixed during or after the addition of the solution.

The moisture content of the polymer powder after the post-crosslinking and before the addition of the solution may vary, and is typically less than about 10 wt. %, preferably less than about 8 wt. % and particularly preferably less than about 5 wt. %.

The pulverulent polymer may contain very fine dust fractions before the addition of the solution, which are formed either in the post-crosslinking or are added to the polymer powder, with the result that the process according to the invention is also suitable for the recycling of fine fractions. Preferably the grain fraction of less than about 150 μm accounts for up to about 15 wt. %, preferably up to about 10 wt. % and most preferably up to about 5 wt. %. An upper grain boundary of about 1000 μm, preferably about 850 μm, has proved suitable for the use of the polymer powders in the hygiene industry.

According to the invention the powder must be mixed intimately and as homogeneously as possible with the solution of the salt of the at least trivalent cation. The mixing may be carried out in a continuous or discontinuous procedure in any apparatus suitable for mixing pulverulent products with liquid additives. The mixing is preferably carried out using a stirrer mixer that is preferably operated at a rotational speed of about 700 to about 1000 r.p.m. In particular renewed damage to the process products is thereby avoided. The intensive mixers with a high energy input of for example about 1000 to about 5000 $Wh/m^3$ that are otherwise described in the prior art (DE 41 31 045 C1) for the surface treatment of superabsorbing polymer powders should preferably not be used for the process according to the invention.

The mixing times are generally between 1 and about 120 minutes, but preferably less than about 1 hour. Temporary agglomerates, such as may be formed by the addition of relatively large amounts of water, are broken down again by the gentle mixing movement of the mixer, but can however prolong the mixing time.

The addition of the solution to the pulverulent polymers takes place preferably in the temperature range from 0° C. to about 100° C., particularly preferably in the range from about 10° C. to about 80° C., most particularly preferably in the range from about 20° C. to about 50° C.

The present invention furthermore provides the polymers that are formed by the process according to the invention.

The pulverulent water-swellable hydrophilic polymers according to the invention may be used for all purposes for which such superabsorbers are normally employed, in particular therefore for the absorption of water and aqueous solutions. They are preferably used in the absorption of body fluids, in particular blood and urine. For this they are incorporated in particular in absorbing single-use disposable hygiene articles, for example in nappies, tampons or sanitary towels, or also for other medicinal purposes. Other possible uses include for example as water-storing floor improvement agents or as moisture binding agents for cable sheathing or as support material for active constituents and their controlled release.

The present invention furthermore provides for the use of a solution of at least one salt of an at least trivalent cation for the restoration of the gel permeability of pulverulent polymers absorbing water or aqueous liquids that have been damaged by mechanical action, synthesised from polymerised, optionally pre-crosslinked, partially neutralised monomers containing carboxyl groups, in which the solution of the salt is added to the pulverulent polymer after the post-crosslinking and the pulverulent polymer and the solution are thoroughly mixed.

By means of the use according to the invention it is possible to restore the gel permeability of polymer powders that have suffered high abrasion damage and with large fine fractions. The stage involving the screening of the fine fractions after the post-crosslinking is omitted. The process products have, compared to superabsorbers according to the prior art, improved gel permeabilities that correspond approximately to those of mechanically unstressed polymers. The retention behaviour is not adversely affected by the process according to the invention and the swellability under pressure is not reduced or only slightly so. Furthermore it has been found that the pulverulent process products have a good flowability, an improvement in the so-called anticaking behaviour, i.e. only a slight tendency to agglomerate in a moist ambient atmosphere, and furthermore have a reduced tendency to form dust.

The treatment steps that are normally envisaged for dust removal and anticaking behaviour may therefore be reduced or dispensed with altogether. The polymer powders according to the invention permit a reliable further processing, for example into nappies, without formation of dust and loss of properties during mechanical or pneumatic conveyance. A further advantage of the process according to the invention is the fact that the solvent fraction introduced via the salt solution does not have to be distilled off, especially if it consists only of water, with the result that the polymer powder can be used without further working-up.

The addition of the solution to the pulverulent polymer takes place in the temperature range from 0° C. to about 100° C., particularly preferably in the range from about 10° C. to about 80° C., most particularly preferably in the range from about 20° C. to about 50° C. Temperatures above 100° C. and/or subsequent temperature treatments are undesirable since they either do not produce any improvement of the properties or may even lead to a deterioration of the properties.

The polymers according to the invention as well as the superabsorbers occurring as a result of the process according to the invention or the use according to the invention are preferably employed in liquid-absorbing hygiene products such as for example baby nappies, incontinence products and sanitary towels.

Liquid-absorbing hygiene products as a rule are generally constructed of a liquid-permeable covering facing the body, a liquid-absorbing suction layer as well as a substantially liquid-impermeable outer layer facing away from the body. Optionally further structures are also used for the rapid absorption and distribution of body fluid in the suction core. These structures are frequently but however not necessarily used between the liquid-permeable covering facing the body and the liquid-absorbing suction layer.

The liquid-permeable covering consists as a rule of a non-woven fibre-like fleece or another porous structure. Suitable materials for this covering include for example synthetic polymers such as polyvinyl chloride or fluoride, polytetrafluoroethylene (PTFE), polyvinyl alcohols and derivatives, polyacrylates, polyamides, polyesters, polyurethanes, polystyrene, polysiloxanes or polyolefins (e.g. polyethylene (PE) or polypropylene (PP)) as well as natural fibre materials and also arbitrary combinations of the aforementioned materials in the sense of mixed materials or composite materials or copolymers.

The liquid-permeable covering has a hydrophilic character. It may furthermore consist of a combination of hydrophilic and hydrophobic constituents. As a rule the liquid-permeable covering is preferably rendered hydrophilic in order to ensure that body fluids are rapidly soaked up into the liquid-absorbing suction layer, although partially hydrophobised coverings are also employed.

Liquid-absorbing Suction Layer

The liquid-absorbing suction layer contains the superabsorbing powders and/or granules and further components of for example fibrous materials, foam-like materials, film-forming materials or porous materials, as well as combinations or two or more of these materials. Each of these materials may either be of natural or synthetic origin or may have been produced by chemical or physical modification of natural materials. The materials may be hydrophilic or hydrophobic, hydrophilic materials being preferred. This applies in particular to those compositions that are intended efficiently to absorb excreted body fluids and transport the latter in the direction of regions of the absorbing core more remote from the entry point of the body fluid.

Suitable hydrophilic fibre materials include for example cellulose fibres, modified cellulose fibres (e.g. stiffened cellulose fibres), polyester fibres (e.g. Dacron), hydrophilic nylon but also hydrophilised hydrophobic fibres such as for example polyolefins (PE, PP), polyesters, polyacrylates, polyamides, polystyrene, polyurethanes, etc., that have been hydrophilised with surfactants.

Cellulose fibres and modified cellulose fibres are preferably used. Combinations of cellulose fibres and/or modified cellulose fibres with synthetic fibres such as for example PE/PP composite materials, so-called bicomponent fibres, such as are used for example for the thermobonding of airlaid materials or other materials are also commonly used. The fibre materials may be present in various application forms, for example as loose cellulose fibres precipitated from an airstream or from an aqueous phase, or laid cellulose fibres, as non-woven fleece or as tissue. Combinations of various application forms are possible.

In addition to the superabsorbers according to the invention there may optionally be used further pulverulent substances, such as for example deodorising substances such as cyclodextrines, zeolites, inorganic or organic salts, and similar materials.

As porous materials and foam-like materials there may for example be used polymer foams such as are described in the specifications DE 44 18 319 A1 and DE 195 05 709 A1, which are hereby incorporated by reference.

Thermoplastic fibres (e.g. two-component fibres formed from polyolefins, polyolefin granules, latex dispersions or hot-melt adhesives) may be used for the mechanical stabilisation of the liquid-absorbing suction layer. Optionally one or more tissue plies are used for the stabilisation.

The liquid-absorbing suction layer may be a single-ply layer or may consist of several layers. Preferably structures are used that consist of hydrophilic fibres, preferably cellulose fibres, optionally having a structure for the rapid absorption and distribution of body fluids, such as for example chemically stiffened (modified) cellulose fibres or highloft fleeces of hydrophilic or hydrophilised fibres as well as superabsorbing polymers.

The superabsorbing polymer according to the invention may be distributed homogeneously in the cellulose fibres or the stiffened cellulose fibres, may be incorporated in the form of plies between the cellulose fibres or the stiffened cellulose fibres, or the concentration of the superabsorbing polymer may exhibit a gradient within the cellulose fibres or stiffened cellulose fibres. The ratio of the total amount of superabsorbing polymer to the total amount of cellulose fibres or stiffened cellulose fibres in the absorbing suction core may vary between 0 to about 100% and about 80 to about 20%, wherein in one embodiment concentrations of up to 100% of superabsorber may be achieved locally, for example with a gradient-type or layer-type incorporation. Such structures with regions of high concentrations of absorbing polymer, in which the proportion of superabsorber in specific regions is between about 60% and about 100% and most preferably between about 90% and about 100%, are also described for example in U.S. Pat. No. 5,669,894, which is hereby incorporated by reference.

Optionally several different superabsorbers differing for example in suction rate, permeability, storage capacity, absorption under pressure, grain distribution or also chemical composition, may also be used simultaneously. The various superabsorbers may be introduced, mixed with one another, into the suction cushion or alternatively may be distribution in a locally differentiated manner in the absorbent core. Such a differentiated distribution may take place over the thickness of the suction cushion or over the length or width of the suction cushion.

The liquid-absorbing suction layer accommodates one or more of the aforedescribed plies of cellulose fibres or stiffened cellulose fibres containing superabsorbing polymers. In a preferred embodiment structures are used consisting of combinations of plies with a homogeneous introduction of superabsorber and in addition a layer-type incorporation.

Optionally these aforementioned structures are also complemented by further plies of pure cellulose fibres or stiffened cellulose fibres on the side facing the body and/or also on the side facing away from the body.

The aforedescribed structures may also be multiply repeated, which may involve a layer formation of two or more identical layers on top of one another or alternatively a layer formation of two or more different structures on top of one another. In this connection the differences are in turn of a purely structural nature or may also relate to the type of material used, such as for example the use of absorbing polymers or different types of cellulose differing as regards their properties. Optionally the whole suction cushion or also individual plies of the liquid-absorbing suction layer are separated by plies of tissue of other components, or are in direct contact with other plies or components.

For example, the structure for the rapid absorption and distribution of body fluids and the liquid-absorbing suction layer may be separated from one another by tissue or may however be in direct contact with one another. Provided there is no separate structure for the rapid absorption and distribution of body fluids between the liquid-absorbing suction layer and the liquid-permeable covering facing the body, but instead the liquid distribution effect is to be achieved for example by the use of a special liquid-permeable covering facing the body, then the said liquid-absorbing suction layer may likewise optionally be separated from the liquid-permeable covering facing the body by a tissue.

Instead of tissue, non-woven fleece may optionally also be incorporated into the liquid-absorbing suction layer. Both components lead to the desired secondary effect of stabilising and securing the absorption core in the moist state.

Process for Producing the Liquid-absorbing Suction Layer

Fibre-containing and superabsorber-containing layers that distribute and store liquid can be made by a large number of production processes.

Apart from the established conventional processes, such as are generally known to the person skilled in the art, involving drum forming with the aid of moulded wheels, pockets and product moulds and correspondingly adapted metering devices for the raw materials, there may also be used modern established processes such as the airlaid process (e.g. EP 850 615, column 4 line 39 to column 5 line 29, U.S. Pat. No. 4,640,810) with all forms of metering, laying of the fibres and compaction such as hydrogen bonding (e.g. DE 197 50 890, column 1 line 45 to column 3 line 50, thermobonding, latex bonding (e.g. EP 850 615, column 8 line 33 to column 9 line 17 and hybrid bonding, the wetlaid process (e.g. PCT WO 99/49905, column 4 line 14 to column 7 line 16), carding, meltblown, spunblown processes as well as similar processes for the production of superabsorber-containing non-wovens (within the meaning of the EDANA definition, Brussels), also in combinations of these processes with conventional methods for the production of the aforementioned liquid storage media. The aforementioned specifications are incorporated by reference.

Further suitable processes include the production of laminates in the broadest sense, as well as the production of extruded and co-extruded, wet-compacted and dry-compacted and also subsequently compacted structures.

Combinations of these processes with one another is also possible.

Structures for the Rapid Absorption and Distribution of Body Fluid

A structure for the rapid absorption and distribution of body fluid consists for example of chemically stiffened (modified) cellulose fibres or highloft fleeces of hydrophilic or hydrophilised fibres or a combination of the two.

Chemically stiffened, modified cellulose fibres may be produced for example from cellulose fibres that have been converted in a chemical reaction by means of crosslinking agents such as for example $C_2$–$C_8$ dialdehydes, $C_2$–$C_8$ monoaldehydes with an additional acid function, or $C_2$–$C_8$ polycarboxylic acids. Particular examples include glutaraldehyde, glyoxal, glyoxalic acid or citric acid. Also known are cationically modified starch or polyamide-epichlorohydrin resins (e.g. KYMENE 557H from Hercules Inc., Wilmington, Del.). A twisted crumpled structure is produced and stabilised by the crosslinking, which acts advantageously on the rate of liquid absorption.

Weight Per Unit Area and Density of Liquid-absorbing Articles

The absorbing hygiene products may differ as regards their weight per unit area and thickness and accordingly the density may vary greatly. Typically the densities of the regions of the absorption cores are between about 0.08 and about 0.25 g/cm$^3$. The weights per unit areas are between about 10 and about 1000 g/m$^2$, preferred weights per unit area being between about 100 and about 600 g/m$^2$ (see also U.S. Pat. No. 5,669,894, which is incorporated by reference). The density varies as a rule over the length of the absorbing core, as a result of a selective metering of the amount of cellulose fibres or stiffened cellulose fibres or of the amount of the superabsorbing polymer, since these components in preferred embodiments are incorporated more strongly into the front region of the absorbing disposable article.

This selective increase in the absorbing material in specific regions of the absorbing core may also be achieved in another way by for example producing an appropriately large two-dimensional structure by means of an airlaid or wetlaid process, the said structure consisting of hydrophilic cellulose fibres, optionally of stiffened cellulose fibres, optionally of synthetic fibres (e.g. polyolefins) as well as of superabsorbing polymers, which are then folded or laid on top of one another.

Test Methods

Test Method 1: Retention (TB)

The retention is measured by the teabag method and is given as the mean value of three measurements. About 200 mg of polymer are welded into a teabag and immersed for 30 minutes in 0.9% NaCl solution. The teabag is then centrifuged for 3 minutes in a centrifuge (23 cm diameter, 1,400 r.p.m.) and weighed. A teabag without water-absorbing polymer is also centrifuged to provide a blank value.

Retention=final weight−blank value/initial weight [g/g]

Test Method 2: Anticaking Test and Moisture Absorption

This test is intended to serve for the evaluation of the caking behaviour and to determine the moisture absorption. For this, 5 g of superabsorber are weighed out into a dish and uniformly distributed, and stored for more than 3 hours at about 38° C. and about 80% relative atmospheric humidity in a climatic test cabinet. The dish is then reweighed in order to determine the moisture uptake. The caking behaviour is determined from the percentage screenings of the superabsorber sample through a screen of 1.68 mm mesh width shaken three times. Superabsorbers with a good anticaking behaviour exhibit only a slight tendency to agglomerate when stored under moist conditions and pass almost completely through the screen.

Test Method 3: Gel Permeability (SFC)

The test is carried out according to a method published in WO 95/22356, which is incorporated herein by reference. About 0.9 g of superabsorber material is weighed out into a cylinder with a screen plate and carefully distributed over the screen surface. The superabsorber material is allowed to swell in JAYCO synthetic urine for 1 hour against a pressure of about 20 g/cm$^2$. After measuring the swelling height of the superabsorber 0.118 M NaCl solution is allowed to flow at constant hydrostatic pressure from a levelled storage vessel through the swollen gel layer. The swollen gel layer is covered with a special screen cylinder during the measurement, which ensures a uniform distribution of the 0.118 M NaCl solution above the gel and constant conditions (measurement temperature 20°–25° C.) as regards the state of the gel bed during the measurement. The pressure acting on the swollen superabsorber is 20 g/cm$^2$. With the aid of a computer and a weighing machine the amount of liquid passing through the gel layer as a function of time is measured at 20-second intervals over a period of 10 minutes. The flow rate (in g/sec) through the swollen gel layer is determined by means of regression analysis by extrapolation of the gradient and determination of the midpoint at time t=0 of the amount of flow within the period 2–10 minutes. The SFC value (K) is calculated as follows:

$$K = \frac{F_x(t=0) \cdot L_o}{r \cdot A \cdot \Delta P} = \frac{F_s(t=0) \cdot L_o}{139506}$$

where:

$F_s(t=0)$ is the flow rate in g/sec $L_o$ is the thickness of the gel layer in cm r is the density of the NaCl solution (1.003 g/cm$^3$)

A is the area of the surface of the gel layer in the measurement cylinder (28.27 cm$^2$)

$\Delta P$ is the hydrostatic pressure acting on the gel layer (4920 dynes/cm$^2$), and K is the SFC value [cm$^3 \cdot$s$\cdot$g$^{-1}$]

Test Method 4: Liquid Absorption Under Pressure (AAP Test)

The absorption under pressure (pressure load 50 g/cm$^2$) is determined according to a method described in EP 0339461, page 7. About 0.9 g of superabsorber is weighed out into a cylinder with a screen plate. The uniformly scattered layer of superabsorber is tamped with a pestle, which exerts a pressure of 50 g/cm$^2$. The previously weighed cylinder is then placed on a glass filter plate arranged in a dish containing 0.9% NaCl solution whose liquid level corresponds exactly to the height of the filter plate. After the cylinder unit has absorbed the 0.9% NaCl solution for one hour, the cylinder unit is reweighed and the AAP is calculated as follows:

AAP=final weight (cylinder unit+fully soaked superabsorber)−initial weight (cylinder unit+superabsorber)/weighed out amount of superabsorber.

Test Method 5: Flowability (FFC Value)

The flowability of the superabsorbing polymer powders is determined with the RST-1.01 annular shear device from Dr.-Ing Dietmar Schulze Schüttgutmeßtechnik. The FFC value provides information on the flow properties of a bulk material in a silo. In the measurement the bulk material is subjected to various loads in an annular shear cell (initial shear load 500,000 Pa, shearing off loads 100,000 Pa, 250,000 Pa, 400,000 Pa and 100,000 Pa) and the FFC value is calculated from the determined measurement values. The flow behaviour can be characterised as follows:

| FFC | Flowability |
|---|---|
| >10 | free flowing |
| 4–10 | slightly flowing |
| 2–4 | cohesive |
| 1–2 | very cohesive |
| <1 | non-flowing |

EXAMPLES

The invention is described in more detail hereinafter with the aid of examples. These explanations are given simply by way of example and do not restrict the general scope of the invention. Unless otherwise specified, all polymer powders have a moisture content of less than 5 wt. %, and the treatments with the salt solutions were carried out at room temperature.

Examples 1–5

Comparison Examples 1–4

Powder of a superabsorbing, partially neutralised acrylic acid polymer post-crosslinked on the surface was taken from an industrial production batch and, without prior screening of the fine fractions (3 wt. % below 150 µm), aqueous solutions of aluminium sulfate, iron(III) chloride and magnesium chloride were added thereto while stirring with a Krups domestic mixer, and the whole was slowly thoroughly mixed on a bank of rollers to break down agglomerates. The quantitative ratio of salt to water as well as the properties of the powders treated with the salt solutions and also the properties of the original powder without screening (V1) and after screening (V2) of the fine fractions under 150 µm are given in Table 1.

TABLE 1

Amounts of salt and water in wt. % added to polymer powder

| Example | $Al_2(SO_4)_3$*/$H_2O$ | $FeCl_3$+/$H_2O$ | $MgCl_2$#/$H_2O$ | AAP | TB | SFC |
|---|---|---|---|---|---|---|
| V1 | | | | 23.2 | 24 | 52 |
| V2 | | | | 23.5 | 24 | 69 |
| B1 | 0.1/0.5 | | | 22.5 | 24 | 53 |
| B2 | 0.1/3.0 | | | 21.6 | 23 | 60 |
| B3 | 1.0/1.0 | | | 21.1 | 24 | 105 |
| B4 | | 0.25/0.5 | | 21.6 | 23 | 98 |
| B5 | | 0.75/3.0 | | 20.6 | 23 | 120 |
| V3 | | | 0.25/3.0 | 22.1 | 23 | 48 |
| V4 | | | 0.25/1.0 | 22.3 | 23 | 37 |

*as hydrate with 18 $H_2O$,
+as hydrate with 6 $H_2O$,
as hydrate with 6 $H_2O$

Comparison Example 5

The same procedure as in V3 is employed except that $CaCl_2$ is used instead of $MgCl_2$. The polymer powder had a teabag retention of TB=23 g/g, an absorption under pressure of AAP=21.9 g/g and a gel permeability of SFC=42 $[cm^3 \cdot s \cdot g^{-1}]$.

Example 6

A surface-crosslinked polymer powder according to Example 8 treated with an aluminium sulfate solution is stored under the conditions of the anticaking test for 3 hours at 83° C. and 80% relative atmospheric humidity and then subjected to the screening test. In contrast to an untreated sample, the polymer powder according to the invention passes almost quantitatively through the test screen whereas the untreated sample remains for the most part on the test screen on account of its tendency to agglomerate.

TABLE 2

| Product Treatment | Moisture Absorption [%] | Screenings [%] |
|---|---|---|
| without $Al_2(SO_4)_3$ | 10.2 | 33.0 |
| with $Al_2(SO_4)_3$ | 8.1 | 99.8 |

Example 7

The powder of a FAVOR® SXM 9100[1] type superabsorber post-crosslinked on the surface, with 3.9 wt. % of fine fractions below 150 µm and a gel permeability of SFC=19 $[cm^3 \cdot s \cdot g^{-1}]$ was homogeneously mixed with 1 wt. % of a 50% $Al_2(SO_4)_3 \times 14$ $H_2O$ solution in a Ruberg mixer. Following this the polymer powder contained only 2.0 wt. % of fine fractions and the gel permeability SFC had increased to 50 $[cm^3 \cdot s \cdot g^{-1}]$.

If the fine fractions below 150 µm are separated from the starting powder not treated with $Al_2(SO_4)_3$ solution, then a powder is obtained with an SFC=43 $[cm^3 \cdot s \cdot g^{-1}]$.

[1]: Surface-crosslinked superabsorber powder of pre-crosslinked, partially neutralised polyacrylic acid from Stockhausen GmbH & Co., KG, Krefeld, Germany.

Example 8

Corresponding to the procedure of Example 7, various amounts of 50 wt. % $Al_2(SO_4)_3 \times 14$ $H_2O$ solution are added to FAVOR® SXM 6565[2] type superabsorber powder post-crosslinked on the surface, containing 3.1 wt. % of fine fractions below 150 µm.

In order to evaluate the abrasion stability the permeability was measured after grinding a sample not treated according to the invention, and one treated according to the invention. The grinding test was carried out with 10 g of product over 6 minutes in a ball mill at 95 r.p.m. The permeability is measured after the grinding test without separating any fine fractions.

TABLE 3

| Wt. % $Al_2(SO_4)_3$ Solution | 0 | 0.4 | 1.0 | 2.0 | 4.0 |
|---|---|---|---|---|---|
| SFC without separation of the fine fractions below 150 µm | 44 | 52 | 67 | 89 | 87 |
| SFC with separation of the fine fractions below 150 µm | 71 | | | | |
| SFC after ball mill treatment | 20 | | | | 79 |

[2]Surface-crosslinked superabsorber powder of pre-crosslinked, partially neutralised polyacrylic acid from Stockhausen GmbH & Co., KG, Krefeld, Germany.

Example 9

A superabsorber powder post-crosslinked on the surface and containing 3 wt. % of fine fractions (<150 µm) obtained from pre-crosslinked polyacrylic acid partially neutralised to an amount of 70 mol % and grafted onto polyvinyl alcohol (Mowiol 5–88, 1.9 wt. % dry substance) was treated according to the invention with 1 wt. % of a 50% aqueous solution of $Al_2(SO_4)_3 \times 18\ H_2O$ by mixing on a bank of rollers. The product had a retention of 25.5 g/g, an absorption under pressure of AAP=21 g/g and a gel permeability of SFC=75 $[cm^3 \cdot s \cdot g^{-1}]$.

Untreated, the superabsorber including 3 wt. % of fine fractions (<150 µm) had a teabag retention of TB=25 g/g, an absorption under pressure of AAP=22 g/g and a gel permeability of SFC=45 $[cm^3 \cdot s \cdot g^{-1}]$. After the screening of the fine fractions the untreated absorber had, under constant retention, an absorption under pressure of AAP=22.5 g/g and a gel permeability of SFC=75 $[cm^3 \cdot s \cdot g^{-1}]$.

Examples 10–13

Comparison Examples 6–7

A superabsorber powder according to Example 1 containing 3 wt. % of fine fractions of <150 µm is treated as in Example 1. The properties of the absorber powders with fine fractions (V6), without fine fractions (V7) and post-treated according to the invention are shown in Table 4.

TABLE 4

Amounts of salt or water in wt. % added to polymer powder

| Example | $Al_2(SO_4)_3$*/$H_2O$ | $FeCl_3^+$/$H_2O$ | AAP | TB | SFC |
|---|---|---|---|---|---|
| V6 | | | 23 | 24 | 45 |
| V7 | | | 23.5 | 23.7 | 69 |
| B10 | 0.5/0.5 | | 21.5 | 24.5 | 93 |
| B11 | 1.0/3.0 | | 22 | 24 | 72 |
| B12 | | 0.25/0.5 | 21 | 24 | 76 |
| B13 | | 0.5/3.0 | 21 | 23.5 | 60 |

*as hydrate with 18 $H_2O$,
+as hydrate with 6 $H_2O$,

Examples 14–19

Comparison Examples 8–10

A superabsorber powder according to Example 1 containing 5, 10 and 15 wt. % of fine fractions of <150 µm is treated as in Example 1. The properties of the absorber powders with fine fractions (V8–V10) and post-treated according to the invention are shown in Table 5.

TABLE 5

Amounts of salt and water in wt. % added to polymer powder

| Example | Fine Fractions Before Treatment | $Al_2(SO_4)_3$*/$H_2O$ | AAP | TB | SFC | Fine Fractions After Treatment |
|---|---|---|---|---|---|---|
| V8 | 5 | | 22 | 24 | 26 | |
| B14 | 5 | 0.5/0.5 | 21.3 | 24.7 | 52 | |
| B15 | 5 | 0.5/3.0 | 20.2 | 24.4 | 45 | 2.5 |
| V9 | 10 | | 21.4 | 24.3 | 29 | |
| B16 | 10 | 0.5/0.5 | 20.8 | 24.3 | 53 | |
| B17 | 10 | 0.5/3.0 | 20 | 23.7 | 45 | 3.5 |
| V10 | 15 | | 21.5 | 23.2 | 25 | |
| B18 | 15 | 0.5/0.5 | 19.6 | 23.7 | 53 | |
| B19 | 15 | 0.5/3.0 | 19.8 | 23.8 | 40 | 4.5 |

*as hydrate with 18 $H_2O$

Examples 20–24

Comparison Examples 11–15

Variously concentrated aqueous solutions of aluminium sulfate were added to powders of a polyacrylic acid polymer partially neutralised to 70 mol % with sodium hydroxide and post-crosslinked on the surface and containing a fine dust fraction <150 µm of 1.1 wt. %, in an MTI mixer (blade mixer) and thoroughly mixed at 750 r.p.m.

TABLE 6

Amounts of salt and water in wt. % added to polymer powder

| Example | $Al_2(SO_4)_3$*/$H_2O$ | FFC | AAP | TB | SFC |
|---|---|---|---|---|---|
| B20 | 0.15/0.15 | 14 | 22.5 | 27 | 47 |
| V11 | without | 5.7 | 23 | 26.5 | 44 |
| B21 | 0.15/0.5 | 11 | 22.8 | 26 | 41 |
| V12 | without | 6.2 | 23.3 | 26.7 | 37 |
| B22 | 0.15/1.0 | 10.4 | 22.8 | 26.5 | 48 |
| V13 | without | 6.2 | 23.5 | 27 | 37 |
| B23 | 0.15/2.0 | 8.6 | 22.3 | 26.8 | 45 |
| V14 | without | 6.2 | 24 | 26.3 | 38 |
| B24 | 0.15/3.0 | 8.3 | 22 | 26 | 63 |
| V15 | without | 6.8 | 23.8 | 26.5 | 46 |

*as hydrate with 18 $H_2O$

The products exhibited a good to extremely good flowability, which in the case of Examples 20–22 was manifested immediately after brief mixing, whereas the products according to Examples 23 and 24 that had been treated with salt solutions of lower concentration required a longer standing and/or mixing time of up to 1 hour.

What is claimed is:

1. A pulverulent polymer suitable for absorbing water or aqueous liquids and post-crosslinked on the surface, the pulverulent polymer is synthesized from polymerized, optionally pre-crosslinked, partially neutralized monomers containing carboxyl groups, wherein the pulverulent polymer further comprises a surface post-crosslinking agent wherein the pulverulent polymer has been reacted, after the surface post-crosslinking, with a solution of at least one salt of an at least trivalent cation.

2. The pulverulent polymer according to claim 1, characterized in that the trivalent cation is at least one aluminium cation, iron cation, and/or manganese cation.

3. The pulverulent polymer according to claim 1, characterized in that the trivalent cation is used in an amount of about 0.001 wt. % to about 1 wt. % based on the weight of the polymer.

4. The pulverulent polymer according to claim 1, characterized in that before the reaction with the solution of at least one salt of a at least trivalent cation.

5. The pulverulent polymer according to claim 1, characterized in that the water content of the polymer during the reaction increases by about 0.05 wt. % to about 10 wt. %.

6. The pulverulent polymer according to claim 1, characterized in that the grain fraction less than about 150 µm before the reaction is less than about 15 wt. %.

7. The pulverulent polymer according to claim 1, wherein the pulverulent polymer comprises carboxyl groups that are neutralized in an amount of about 25 mol % to about 85 mol %.

8. The pulverulent polymer according to claim 1, comprising further comonomers and/or graft polymers.

9. A process for the production of pulverulent polymer according to claim 1, post-crosslinked on the surface and absorbing water or aqueous liquids, comprising the steps of (1) solution of at least one salt of an at least trivalent cation is added to the pulverulent polymer after the post-crosslinking and heat treatment; and (2) the heat-treated post-crosslinked pulverulent polymer, and the solution are preferably thoroughly homogeneously mixed.

10. The process according to claim 9, wherein the temperature of the polymer powder during the post-treatment is about 60° C. to about 100° C.

11. The process according to claim 9, wherein the thorough mixing pulverent polymer and solution is effected with a stirrer operating at a rotational speed of about 700 r.p.m. to about 1000 r.p.m.

12. A pulverulent polymer obtained by the process according to claim 9.

13. An absorption agent for liquids, in particular water and aqueous liquids comprising the pulverulent polymer according to claim 1.

14. An absorption agent for aqueous liquids, in structures for absorbing body fluids, in foamed and non-foamed two-dimensional structures, in packaging materials, in plant growing, and as a soil amelioration agent, the absorption agent comprising the polymer according to claim 1.

15. A hygiene article comprising the polymer of claim 1 such as diapers or tampons.

16. A carrier substance for active constituents, in particular for fertilizers or other active constituents that are optionally released in delayed form, wherein the carrier substance comprises the polymer of claim 1.

* * * * *